Nov. 21, 1939.　　　　A. MESSER　　　　2,180,715
LIQUEFACTION AND SEPARATION OF GASES
Filed Oct. 9, 1936
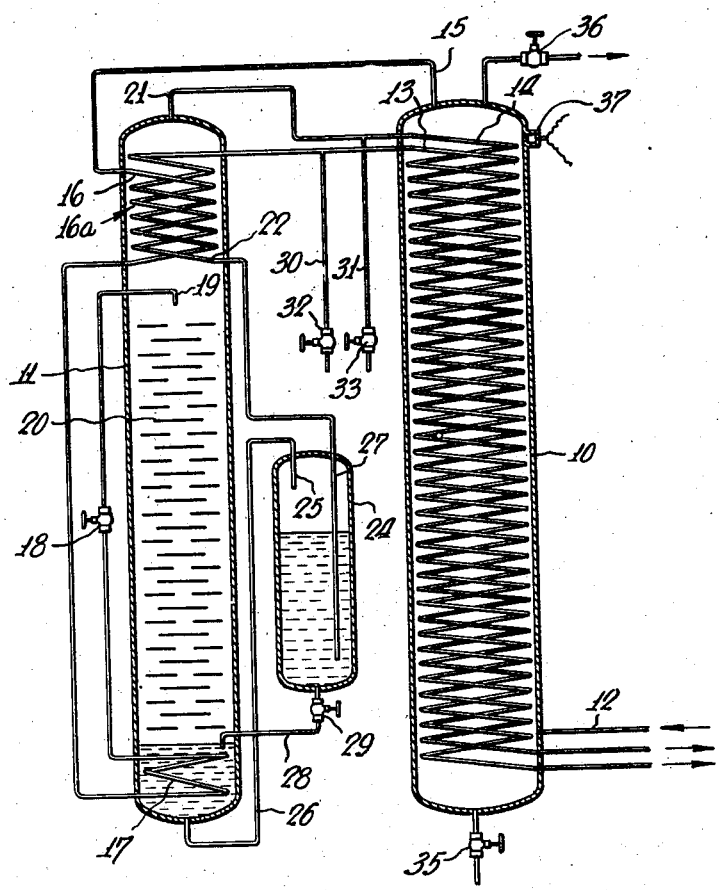
INVENTOR
Adolf Messer
BY
ATTORNEYS Patented Nov. 21, 1939

2,180,715

UNITED STATES PATENT OFFICE 2,180,715

LIQUEFACTION AND SEPARATION OF GASES

Adolf Messer, Frankfort-on-the-Main, Germany

Application October 9, 1936, Serial No. 104,791

8 Claims. (Cl. 62—122)

In the operation of air separating plants for the production of oxygen and nitrogen, the purification of the air from carbon dioxide, and the separation of the moisture, by the use of expensive chemicals and complicated equipment, and the very long starting periods required every day after a shutdown in intermittently operated plants to restore the plant to the required low operating temperatures, are recognized disadvantages which very greatly increase the production costs, especially of the smaller plants. The present invention involves certain improvements whereby such disadvantages are overcome or minimized.

Air separating plants for the production of oxygen and introgen are known, where the carbon dioxide and the moisture, which have to be separated before cooling the air down to low rectifying temperatures, are frozen out in suitable heat interchangers by lowering the temperature of the incoming air. Often, two such heat interchangers are provided and work alternatively at longer or shorter intervals, one being in operation while the other is being defrosted. For continuous operation, such an apparatus is suitable, but if the operation of the apparatus is required for only 8 to 10 hours per day such an apparatus is not suitable because the alternation in the operation of the heat interchangers gives rise to undesirable fluctuations in the temperature of the separating apparatus, which may cause trouble in the separating process.

Considering the fact that it is sometimes required to run an oxygen or nitrogen producing plant intermittently, my new and improved process and apparatus will make it possible to separate out both the moisture and the carbon dioxide from the incoming air, without alternating the operation of any heat interchanger and without using any chemicals.

In carrying out the invention in its preferred form, there is placed before the air rectifying apparatus a heat interchanger which is of such size and which is so constructed that it can freeze out the moisture contained in the air during one week of intermittent operation, and can also solidify and separate the carbon dioxide contained in the air in the coldest part of the heat interchanger, during a working period of about 80 to 100 hours without shutting down the plant.

If the accumulation of solid carbon dioxide in the heat interchanger becomes sufficient to noticeably restrict the passage of air therethrough during the daily working period, this restriction can be overcome after the plant has been shut down for the usual periodical interruption, for instance at the end of the daily working time, by shutting off the passage of the cold separated components of the air through the heat interchanger in which the separation of the carbon dioxide takes place, and permitting this heat interchanger, during the shut-down period, to get sufficiently warm by conduction and radiation to gasify the solid carbon dioxide in said heat interchanger. The temperature at the lower end of the heat interchanger is lowered by this conduction, but according to my improved process it is only necessary to heat up the heat interchanger at its cold end. The gasified carbon dioxide is released into the open air through suitable valves.

The defrosting of the heat interchanger of frozen moisture and the removal of the moisture can be done every week by simply shutting down for the weekend and drawing off the thawed-out moisture. This long shut-down period raises the temperature of the heat interchanger sufficiently to not only gasify and eliminate the carbon dioxide but also to thaw the frozen moisture and permit it to be drained out.

Preference has been given up to now to the continuous operation of the oxygen producing plants, because every interruption of the operation gave rise to losses. Such losses were due to radiation of heat through the insulation, and also to the heat exchange within the apparatus itself, owing to the heat conductivity of the metal. After having shut down for long periods, for instance for 12 hours, it was necessary to run the plant for several hours before it got cold enough to produce oxygen and nitrogen.

The continuous operation of the air separating plants has, however, certain disadvantages. If, for instance, one desired to produce, in a plant of his own, the oxygen consumed in his workshops, he had to install a plant of such a small output that the oxygen required by the workshop during its operating time of 8 hours, would be continuously produced during a 24 hour period. This working method makes it necessary to use a relatively large storage tank for the oxygen produced, and to compress this oxygen for storing to a high pressure. Furthermore, the staff for operating the plant must be divided in three shifts.

Usually the working organization in an industrial plant provides for a normal working time of 8 hours, so that the men attending a continuously operated air separating plant during the other 16 hours of the day cannot do any other work to make their time more serviceable.

It has therefore become desirable to construct air separating plants which can be suitably operated for 8 hour periods every day, without requiring any long starting periods. One object of the present invention is to provide such a plant, and to accomplish that object I produce, during the normal working period, a relatively small extra quantity of liquid oxygen, which is passed through a separate storage tank connected with the rectification column and forming part of the oxygen circuit between the rectification column and the heat interchanger. This storage tank is filled with liquid during the operation of the separating plant, and is of such a size and contains such a quantity of liquid oxygen that the evaporation of this liquid oxygen, during the normal shut-down period, is sufficient to keep the rectification column and the heat interchanger at the desired low temperature during this period, provided that there are no obstructions by solid carbon dioxide in said interchanger. This makes it possible to start the plant in oxygen producing operation in a short period even after an interruption of 16 hours, so that the cost of running the separating plant is materially reduced. The storage tank for the liquid oxygen can be arranged at the bottom, at the top, or at one side of the rectification column, or it may be arranged to form a jacket around said column.

It is desirable that no valves be provided at the normal inlet and outlet of the storage tank, otherwise any error by the operator, in the manipulation of such valves, might cause an explosion in the storage tank. However, a return piping leading from this storage tank to the lower end of the rectification column, and including a regulating valve for the liquid oxygen, must be provided.

While the plant is shut down, the valve located in the return piping is opened, and the liquid oxygen from the storage tank is returned into the bottom of the rectification column where it slowly evaporates and passes upwardly through said column, so that this column is maintained cold during the shut-down. The products of this evaporation process, in this case pure oxygen, are preferably conducted from the rectification column into a storage gas holder which is under the usual gasometer pressure. As soon as the plant is started again, the oxygen in said gas holder maybe compressed from 8 to 10 atm. and stored in the storage reservoirs.

The apparatus may also be of such a construction that the oxygen evaporated for maintaining the rectification column cold during the shut-down period, is conducted under a certain pressure directly into these storage reservoirs, where the oxygen produced by the plant, during its normal operation, has been stored up.

In the accompanying drawing there is shown for the purpose of illustration, an apparatus which embodies the present invention and which may be used to carry out my improved process.

In the specific embodiment of the invention shown, the separating apparatus includes a heat interchanger 10 and a rectification column 11. The air to be rectified is introduced under pressure into the interchanger 10 through an inlet 12 at the bottom of said interchanger, and passes upwardly through said interchanger in countercurrent heat interchange relationship with the cold separated oxygen and nitrogen passing respectively through the coils 13 and 14, so that said air is cooled to a low temperature before being introduced into the rectification column 11 from the top of the heat interchanger 10 through an outlet 15.

The heat interchanger 10 is so designed and operated that the temperature of the air at the outlet end of the interchanger is low enough so that all of the carbon dioxide contained in said air is solidified in the upper part of said interchanger, and the air leaving the heat interchanger has no trace of carbon dioxide. The precooling of the air also causes the freezing of the moisture in the air and the separation thereof in the lower part of the heat interchanger, so that the precooled air leaving the heat interchanger will be purified of both carbon dioxide and moisture. This purified precooled air is then passed through a coil 16 in an auxiliary heat interchanger 16a in the upper part of the rectification column 11, delivered through a coil 17 in the bottom of the rectification column 11, expanded through a valve 18 and delivered through an outlet 19 above a series of trays 20 of the usual type.

As the resulting liquid air trinkles downwardly over the trays 18, the nitrogen gas separates and passes upwardly through an outlet 21 in the upper end of the rectification column and through the coil 14 in the heat interchanger 10. The oxygen which is separated from the air collects in liquefied form at the bottom of the rectification column and is delivered from the bottom of the rectification column 11 through a coil 22 forming part of the auxiliary heat interchanger 16a, and then passed through the coil 13 of the heat interchanger 10.

As an important feature of the present invention, there is disposed between the bottom of the rectification column and the heat interchanger 10, a storage tank 24 in the form of a trap having an inlet 25 connected by a pipe 26 to the bottom of the rectification column 11, and an outlet 27 connecting with the coil 22. During the normal operation of the apparatus, the separated liquid oxygen is delivered from the bottom of the rectification column 11 through the storage tank 24, through the auxiliary heat interchanger 16a, and then through the heat interchanger 10. During this operation, a certain amount of liquid oxygen is trapped in said storage tank as shown. In order to return the stored liquid oxygen in the tank 24 after the working period there is provided at the bottom of said tank a return pipe 28 controlled by a valve 29 and leading into the bottom of the rectification column 11, and closed during normal operating conditions.

The oxygen and nitrogen pipes leading from the top of the rectification column to the main heat interchanger 10, are provided with branch outlets 30 and 31 controlled by valves 32 and 33, so that the passage of the separated components of the air from the rectification column to the heat interchanger 10 may be cut off from said interchanger.

The carbon dioxide which is solidified in the upper end of the heat interchanger 10 and the moisture of the air which is solidified or condensed in the bottom portion of the heat interchanger, tend to restrict the passage of the air and to retard the heat interchanging action. Moisture which has condensed but not frozen will collect in the form of water at the bottom and may be blown off through a valve 35 in the bottom of the heat interchanger. If the accumulation of solid carbon dioxide in the upper portion of the rectification column becomes such as to impair the efficient operation of the apparatus, it may be eliminated by closing the expansion valve 18, opening the valve 36 connected to an outlet at the upper end of the heat interchanger 10, and blowing hot air through said heat interchanger until the thermometer 37 at the top indicates that all of the accumulated solid carbon dioxide has gasified. Any water which may have accumulated in the bottom of the heat interchanger from the melting of frost may be drawn off through the valve 35. During this process of eliminating the accumulated solid carbon dioxide, the rectification column is maintained cold by the evaporation of the liquid oxygen which has collected in the bottom of said rectification column, so that when the apparatus is restarted no material time is lost in bringing the temperature of the apparatus into oxygen producing condition.

Another method by which the accumulated carbon dioxide may be eliminated from the heat interchanger 10 is to open the valves 32 and 33 so that the cold separated oxygen and nitrogen leaving the rectification column 11, instead of passing through the heat interchanger 10, is delivered into the air or into a gas holder so that the temperature of the heat interchanger at its upper end is permitted to increase to a temperature which will cause all of the solid carbon dioxide to gasify and to be purged out through the valve 36. If the supply of air through the pipe 12 is shut off, this raising of the temperature at the upper end of the heat interchanger 10 may result from the conduction of heat from the warmer lower portion of the heat interchanger to the colder upper end, and also partially from heat radiation, so that only the upper portion of the heat interchanger 10 is heated to the vaporizing temperature of carbon dioxide.

At the end of the normal operating period, when it is desired to shut the plant down, the valve 29 is opened to drain the liquid oxygen from the storage tank 24 into the lower portion of the rectification column 11, so that during normal shut-down periods, the evaporation of this liquid oxygen in the rectification column serves to maintain this column and the heat interchanger cold. During this shut-down period, the valves 32, 33 and 36 may be open or closed, depending upon whether or not it is desired to defrost at the same time. This elimination of the solid carbon dioxide may be effected during normal week-end shut-downs. When the apparatus is restarted, it will take a comparatively short time to bring it into oxygen separating condition.

Having thus described my invention, what I claim as new and desire to secure by Letters Patent is:

1. The method of reducing the starting time of an intermittently operated air separating plant of the type which includes a rectification column, which comprises storing a portion of the liquid oxygen formed by said plant during its normal operating period in a separate storage tank, and permitting said liquid oxygen to evaporate in said rectification column during a normal shut-down period, to maintain said column cold.

2. The method of reducing the starting time of an intermittently operated air separating plant of the type which includes a rectification column and a heat interchanger, comprising storing a certain amount of liquid oxygen formed by said plant during its normal operating period in a receptacle separate from said column, returning said liquid oxygen to the column to evaporate therein during a normal shut-down period, and passing said evaporated oxygen through said heat interchanger and said rectification column to maintain a low temperature therein during the entire shut-down period.

3. The method of reducing the starting time of an intermittently operated air separating plant of the type which includes a rectification column and a heat interchanger, comprising storing a certain amount of liquid oxygen formed by said plant during its normal operating period in a receptacle separate from said column, returning said liquid oxygen to the column to evaporate therein during a normal shut-down period, and passing said evaporated oxygen through said rectification column to maintain a low temperature therein during the entire shut-down period.

4. An air separating apparatus including a heat interchanger for precooling the incoming air and separating the moisture and carbon dioxide therefrom, a rectification column for separating the purified air into oxygen and nitrogen, a conduit leading from said column below the liquid level in the latter, for conducting the cold separated liquid oxygen from said rectification column to said heat interchanger, and including a storage tank for storing liquid oxygen during normal operation, and means permitting the return of stored liquid oxygen to said rectification column, whereby during shut-down periods, the evaporation of said liquid oxygen maintains said rectification column at a low temperature returned to said column from said tank.

5. An intermittently operated air separating apparatus including a rectification column, means at the outlet of said column for trapping a portion of the liquid oxygen formed by said apparatus during its operating period, and valved means for delivering said trapped liquid oxygen to said rectification column, whereby upon a shut-down of the apparatus the evaporation of said trapped liquid oxygen maintains the rectification column at a low temperature, said trapping means being sufficiently large to trap enough liquid oxygen during a normal operating period of the plant to maintain the rectification at a low temperature during a normal shut-down period of about twelve to sixteen hours.

6. An air separating apparatus including a rectification column, a heat interchanger, a liquid oxygen storage tank, a conduit leading from the bottom of said rectification column to the top of said tank, a conduit leading from said storage tank to said heat interchanger whereby during normal operations the oxygen is passed through said tank from said column to said heat interchanger, and a valve controlled conduit connecting said storage tank and the lower portion of said column for permitting return of liquid oxygen from said tank to said column during shut-down periods.

7. An air separating apparatus including a rectification column, a heat interchanger, a conduit connecting said heat interchanger with the bottom of said column and including a liquid oxygen storage tank, a valve controlled outlet permitting discharge of gaseous oxygen from said conduit without passing through said interchanger, and a valve controlled conduit for returning liquid oxygen from said tank to the bottom of said column.

8. The process of eliminating carbon dioxide from the air to be separated into oxygen and nitrogen in an intermittently operated air separating plant having a rectification column and a heat interchanger, which comprises passing the air through said heat interchanger in heat exchange relationship with the cold separated components of the air from the rectification column to lower the temperature of said air in said interchanger to a temperature sufficiently low to separate the moisture and to solidify the gaseous carbon dioxide in the cold end of said heat interchanger, thereafter shutting off the passage of air from the interchanger to the column, continuing the delivery of air through the interchanger and discharging it to the atmosphere, and shutting off the passage of said cold component gases through the heat interchanger while permitting the evaporation of oxygen in said rectification column and the escape thereof without passing through the interchanger, whereby the heat interchanger is heated at its cold end sufficiently to effect gasification of the carbon dioxide therein while said rectification column is maintained at a low temperature by the evaporation of oxygen therein.

ADOLF MESSER.